UNITED STATES PATENT OFFICE.

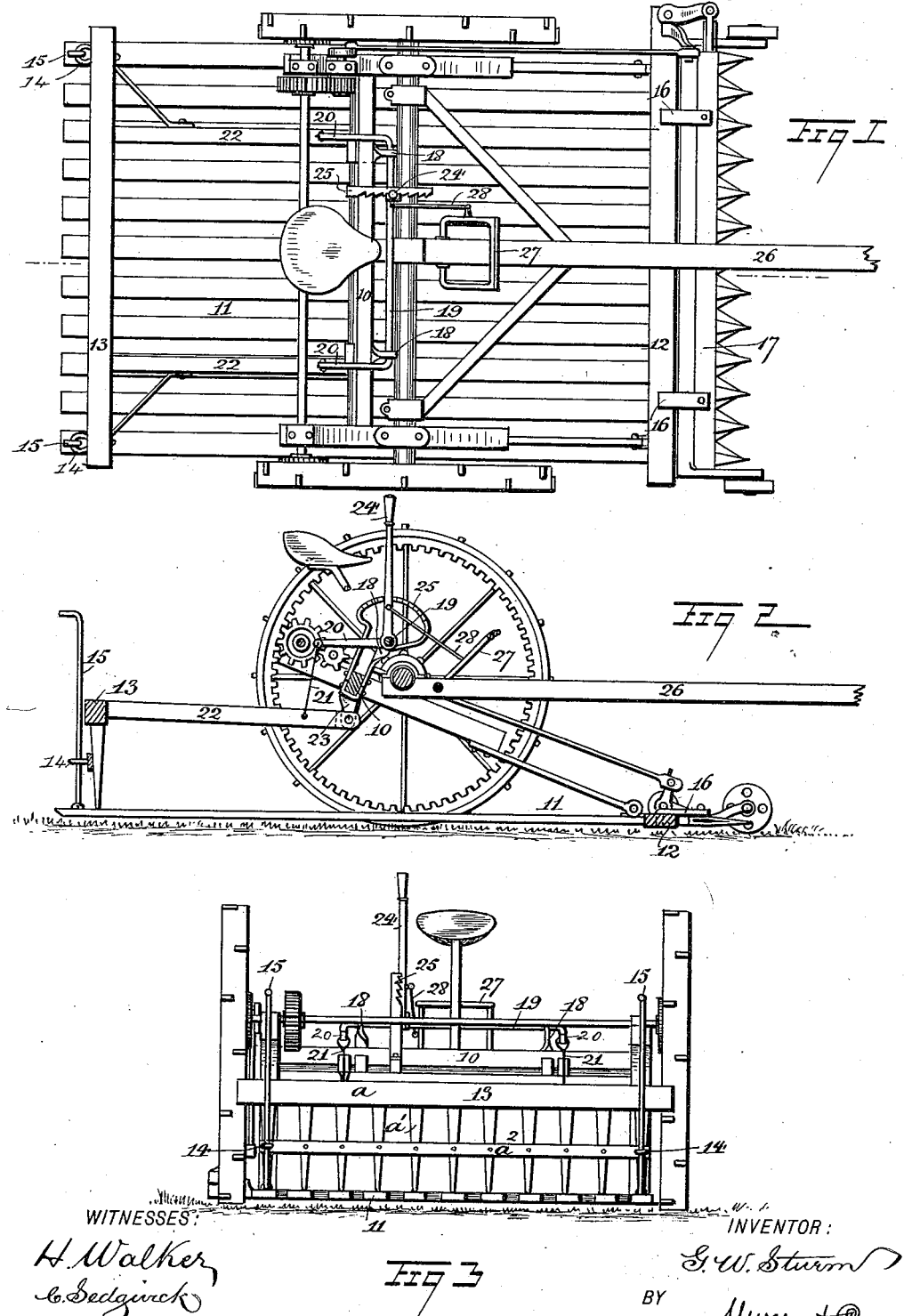

GEORGE W. STURM, OF DANA, INDIANA.

ATTACHMENT FOR CENTER-CUT MOWERS.

SPECIFICATION forming part of Letters Patent No. 427,278, dated May 6, 1890.

Application filed February 26, 1890. Serial No. 341,806. (No model.)

*To all whom it may concern:*

Be it known that I, GEORGE W. STURM, of Dana, in the county of Vermilion and State of Indiana, have invented a new and Improved Attachment for Center-Cut Mowers, of which the following is a full, clear, and exact description.

My invention relates to an attachment for center-cut mowers, and has for its object to provide a device especially adapted for use in winnowing clover capable of attachment to any center-cut mower, which will keep the heads and leaves for a predetermined period out of contact with the ground, and afterward deliver the cut clover in rows upon the ground in complete condition for the huller.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of one form of center-cut mower having the attachment applied thereto. Fig. 2 is a longitudinal section taken practically through the center of Fig. 1, and Fig. 3 is a rear elevation.

The center-cut mower, as heretofore stated, may be of any suitable or approved construction, and therefore it will not be necessary to enter into the details of construction of such mower, as its operative parts have no direct connection with the attachment, it simply being necessary that the machine be provided at the rear of its axle with a transverse beam 10, which beam may constitute a portion of the frame, as illustrated.

The device consists, primarily, of a slatted platform 11, the slats being connected at their forward ends by a transverse bar or beam 12, and a gate 13 is adapted to extend transversely across the slatted platform at or near its rear extremity, the said gate being provided, preferably, at each extremity with an eye 14, which eyes are adapted to slide upon standards 15, one of said standards being secured to each outer slat of the platform, as illustrated in Figs. 1 and 2.

The gate usually consists of a suitable head $a$, from which a series of teeth $a'$ are downwardly projected, the number of the teeth ordinarily corresponding to the number of slats in the platform, and the teeth are usually braced by a beam or bar $a^2$, located between the extremities of the teeth and extending parallel with the head from one end tooth to the other, as best shown in Fig. 3.

The forward cross-beam 12 of the platform is provided with two or more forwardly-extending straps or metal plates 16, and the said forward end of the platform is adapted to be connected directly with the finger-bar 17 of the mower, the attachment being usually effected by unscrewing two or more of the nuts of the guards and passing the forward extremities of the straps 16, which are suitably apertured, over the bolts and again screwing the nuts to place.

Upon the transverse rear beam 10 of the mower-frame, at each side of its center, a bracket 18 is secured, the said brackets being made to extend vertically upward, and in the brackets a crank-shaft 19 is journaled, the crank-arms 20 of which shaft are located at its ends and extend rearward. The crank-arms 20 of the crank-shaft are connected by links 21 with rigid arms 22, horizontally and forwardly projected from the rake-head $a$, the forward extremities of the said arms being pivotally attached to hangers 23, secured to the under face of the frame-beam 10. If in practice, however, it is found desirable, the brackets 18 may be carried downward below the beam and the rake-arms 22 be pivoted to the same. The straight or body section of the crank-shaft 19, preferably at the left of its center, has attached thereto a lever 24, which extends upward within convenient reach of the driver's seat and is adapted for engagement with any approved form of rack 25, and in front of the driver's seat to the tongue 26 of the mower a foot-treadle 27 is preferably secured, which foot-treadle has a link-connection 28 with the crank-shaft, the connection being effected through the lever 24, as best shown in Fig. 1.

It will thus be observed that the driver may elevate the gate 13 either by manipulating the lever 24 or by exerting pressure upon the treadle 27. The said treadle may, if in practice it is found desirable, be hinged or pivoted upon the base of the seat-supporting standard.

The slatted platform 11 is located horizontally just above the surface of the ground, and is of sufficient width to pass conveniently between the drive-wheels of the mower. Its length is sufficient to extend from the cutter-bar some distance to the rear of the mower.

In operation, as the clover is cut, it passes over the front beam 12 of the platform upon the slatted portion thereof, and the advancement of the machine causes the stubble which projects upward within the spaces intervening the slats of the platform to carry the cut clover to the rear, and at the rear of the platform the progress of the clover is arrested by the gate 13, the teeth of which are normally in contact with the slats of the said platform. When a sufficient amount of clover has been accumulated at the gate, the lever 24 or the treadle 27 is manipulated to elevate the gate, whereupon the clover passes from the platform to the ground and remains thereon in uniform rows.

This system of winnowing clover has many advantages—as, for instance, first, the leaves and heads are left in complete condition for the huller; second, the cut clover is left standing on end with the heads upward, so that if the season is rainy the clover will dry out without handling, as is necessary in most of the methods in general use; and, further, the seed of the clover is prevented from growing. The device also economizes in labor both in cutting and in gathering up the cut clover. Furthermore, the device leaves the clover lying loose upon the ground, thus avoiding killing the clover-roots, as is the case when the clover is left in heavy compact bunches.

Having thus described my invention, I claim as new and desire to secure by Letters Patent—

1. An attachment for center-cut mowers, consisting of a slatted platform adapted for attachment at its forward end to the finger-bar of the mower and a gate located at the rear end of the platform and adapted to be elevated, substantially as shown and described.

2. An attachment for mowers, consisting of a slatted platform adapted for attachment at its forward end to the finger-bar of the mower and a vertically-movable gate located at the rear end of the platform normally in contact therewith, the said gate consisting of a head bar or beam and teeth extending downward from said head, substantially as and for the purpose specified.

3. The combination, with a cross-beam of a center-cut mower and its finger-bar, of a slatted platform attached at its forward end to the finger-bar, a gate contacting with the upper surface of the said platform at its rear end, a crank-shaft mounted upon the cross-beam of the mower, arms projected from the gate and pivoted to the cross-beam, and a link-connection between the crank-arms of the crank-shaft and the gate-arms, substantially as shown and described.

4. The combination, with a cross-beam of a center-cut mower-frame and its finger-bar, of a slatted platform detachably attached to the finger-bar, guide-standards projected upward from the rear end of the platform, a gate located at the said rear end of the platform and attached to the said guide-standards, arms projected from the gate and pivoted to the cross-beam of the mower-frame, a crank-shaft journaled upon the said cross-beam, the crank-arms of which shaft are connected with the rake-arms, and a lever attached to the said shaft, whereby said shaft may be rocked and the gate raised out of contact with the platform, substantially as shown and described, and for the purpose specified.

GEORGE W. STURM.

Witnesses:
ALFRED J. RALPH,
HENRY STURM.